United States Patent Office 2,800,468
Patented July 23, 1957

---

2,800,468
AZO VAT DYES OF THE TRIAZINE ANTHRA-QUINONE SERIES

Mario Scalera, Somerville, and Asa Willard Joyce, Plainfield, N. J., assignors to American Cyanamid Company, New York, N. Y., a corporation of Maine No Drawing. Application November 14, 1955,
Serial No. 546,764

11 Claims.  (Cl. 260—153)

This invention relates to new vat dyes of the triazine anthraquinone series containing azo groupings. More particularly, it relates to vat dyes of the formula:

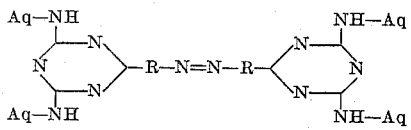

in which Aq is an anthraquinonyl radical and R is a carbocyclic six-membered aromatic ring in which the azo group is attached in a position other than ortho to the triazine ring. The dyestuffs of this invention dye cotton yellow to red shades of good fastness from an alkaline hydrosulfite vat.

The class of vat dyes comprising aryltriazinylaminoanthraquinones is known in the prior art. Some of the better yellow to red shade vat dyes belong to this series. Dyestuffs of this class having an azo group attached to the aryl moiety have not heretofore been known. Since the azo group is normally very sensitive to reduction by hydrosulfite, one would expect that the presence of such a group would afford little advantage. There would be little point to add to a fast vat dyestuff, a grouping which is sensitive to reduction under the normal conditions of application to the fiber.

We have now found that, by introducing an azo group which connects two such aryltriazinylamino anthraquinone vat residues through the aryl groups, there are obtained new yellow to red vat dyes having shades deeper than those exhibited by the corresponding molecules without the azo group. Furthermore, we have found that these new azo dyestuffs are stronger tinctorially and have better affinity for cellulosic fibers such as cotton and rayon. When applied by known vat dyeing methods, these new dyestuffs are readily vatted without reduction of the azo group, forming red to reddish-brown vats. They dye cotton readily with good build-up, fastness to washing and chlorine, and good light fastness.

The products of our invention can be prepared in a variety of ways. The nature of the dyestuff, especially the orientation of the azo grouping, will differ depending on the route of synthesis.

*Method I.—Nitration of an aryltriazine vat dye*

An aryltriazine anthraquinone vat dye nitrated directly is the first method. Reduction of the resulting nitro compound with an alkaline glucose solution produces the dyestuffs of our invention. This method can be illustrated by the following equation:

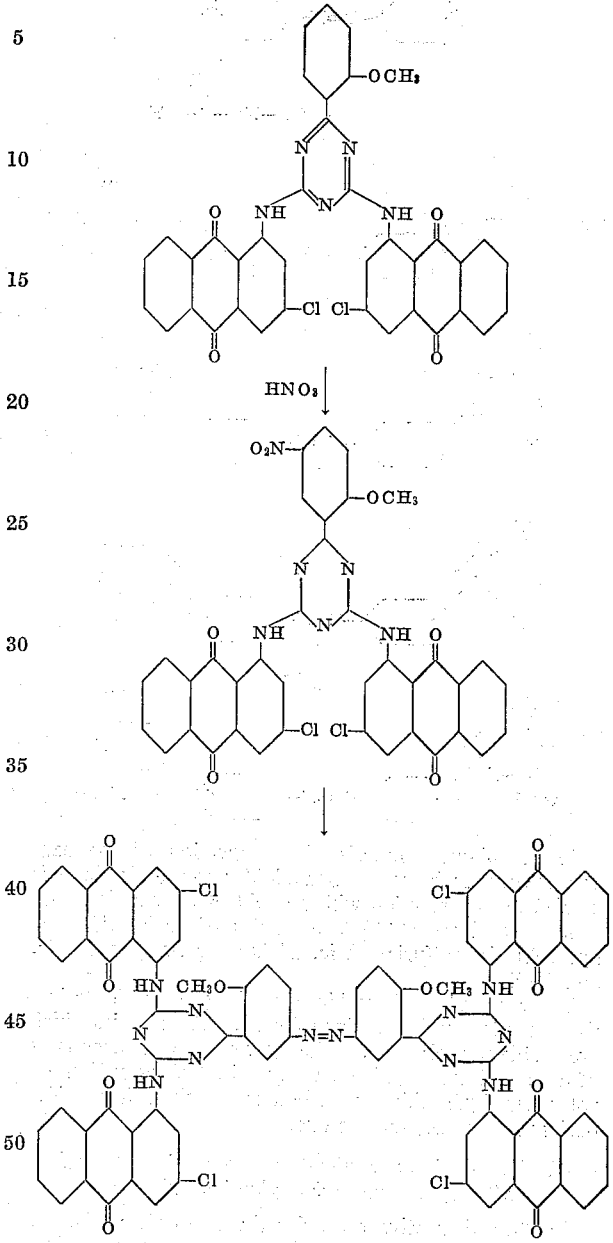

In this method, it is preferable that the anthraquinonylamino part of the molecule carry substituents which deactivate it to prevent the nitrations occurring in that part of the molecule. It is also helpful if the aryl substituent on the triazine nucleus carry an activating group such as alkoxy in order to direct further the nitration into that ring.

Method II.—Synthesis from an azobenzene

A second alternative synthesis is to build the dye molecule from an azobenzene. 3,3'- or 4,4'-dicarboxyazobenzene is converted to the corresponding acid chloride and reacted with dicyandiamide to form an azobenzene-bis(carboxy cyanoguanidide), which upon treatment with dilute acid forms the corresponding double biuret. This, on treatment with alkali, ring-closes to form the bis-guanamido azobenzene. The bis-benzoguanamido azobenzene is chlorinated with phosphorous pentachloride or thionyl chloride and the resulting chloro compound is reacted with an aminoanthraquinone to form the dyestuffs of our invention. These steps are shown in the following synthesis:

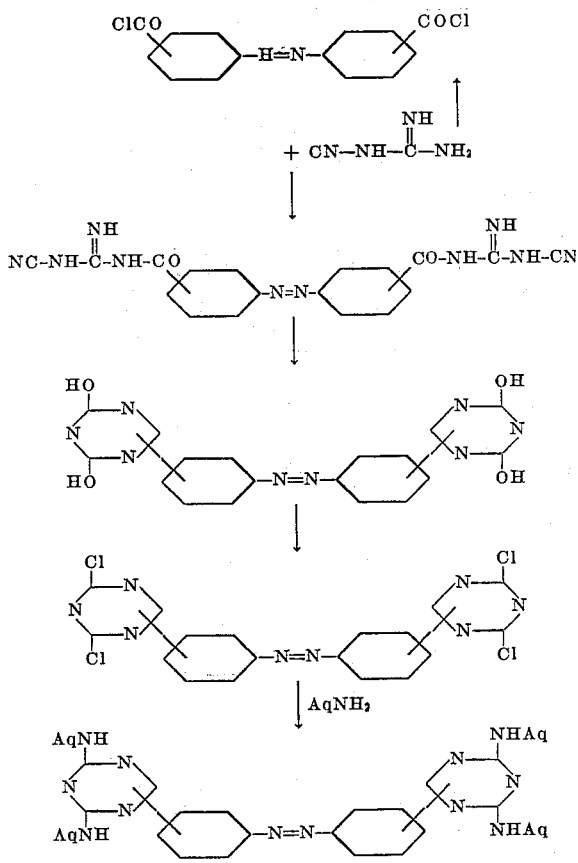

In the above synthesis, the conversion of the azobenzene-(bis-carboxy cyanoguanidide) to the bis-biuret is carried out by reaction with an acid of dissociation constant of at least $1 \times 10^{-4}$, examples of such acids are, hydrochloric, sulfuric, nitric, trichloroacetic, phosphoric, and the like.

The conversion of the biuret to the guanamide derivative is carried out in alkaline solution. The alkalies which are usable for this step are the hydroxides and carbonates of the alkali and alkaline earth metals, such as sodium or potassium hydroxide or carbonate, calcium hydroxide, barium hydroxide, and the like.

Method III.—From a nitrobenzoguanamide through a nitroaryldianthraquinonylamino triazine Another alternative route for the synthesis of the vat dyes of our invention starts with a nitrobenzoguanamide. By reaction of this with a chlorinating agent such as phosphorous pentachloride the corresponding nitrophenyl dichloro triazine is formed. This is then reacted with an aminoanthraquinone to form a nitrophenyl dianthraquinonylamino triazine. On treatment with an alkaline reducing agent (for example, alkaline glucose solution) the nitro group is reduced to an azo group with a doubling of the molecule to form the vat dye of our invention. This synthesis is shown in the following equation:

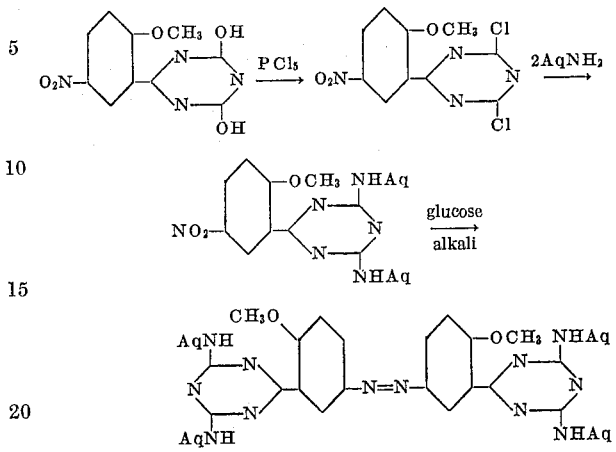

Method IV.—From a nitrobenzoguanamide through the bisguanamido azobenzene

The preferred method of synthesizing the dyestuffs of our invention uses as the starting material a benzoguanamide which may be substituted by halogens, alkyls, alkoxy groups, or any other substituent which confers no water solubility on the molecule. The nitrobenzoguanamide formed by the nitration of such a benzoguanamide is reduced in alkaline glucose solution to the bis-benzoguanamido azobenzene. This is then chlorinated with an agent such as phosphorous pentachloride, phosphorous oxychloride or thionyl chloride, usually in solution in ortho-dichlorobenzene or nitrobenzene. The use of phosphorous pentachloride is the preferred method. The chlorotriazinyl compound thus formed, is reacted with an aminoanthraquinone to form the vat dyes of our invention. This synthesis is set forth in the following equation:

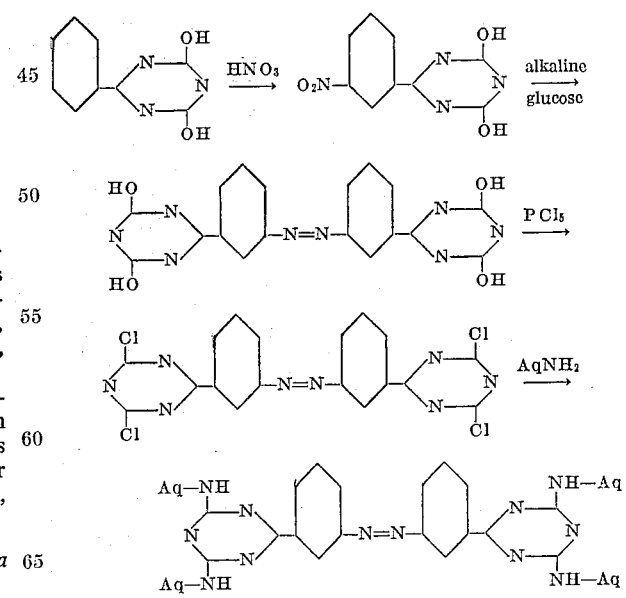

The aminoanthraquinones which may be used in the preparation of our new vat dyes include both alpha and beta aminoanthraquinones. Usually better tinctorial strength is obtained with the use of alpha-aminoanthraquinones. Among the compounds which can be used in the preparation of the compounds of our invention are, alpha - aminoanthraquinone, 1 - amino - 2 - methylanthraquinone, 1-amino-3-chloroanthraquinone, 1 - amino - 6- chloroanthraquinone, 1-amino-6,7-dichloroanthraquinone, 1-amino-4-methoxyanthraquinone, 1-amino-4-benzamidoanthraquinone, 1-amino-5-benzamidoanthraquinone, 1-amino-8-benzamidoanthraquinone, 1-amino-4-methoxy-5-benzamidoanthraquinone, 4-amino-1,9-pyrazolanthrone, 4-amino-1,9-thiazoloanthraquinone, 4-aminoanthraquinone-1,2-benzacridone, 2-aminoanthraquinone, 1-chloro-2-aminoanthraquinone, 2-amino-3-chloroanthraquinone, 2-amino-3-bromoanthraquinone, 2-amino-3-methylsulfonylanthraquinone, 2-amino-3-ethylsulfonylanthraquinone, 2-amino-6-benzoylaminoanthraquinone, and the like.

The aryl group between the azo grouping and the triazine rings may carry other substituents such as the halogens, as for example, bromine and chlorine, alkyl groups such as methyl, ethyl, propyl, butyl, etc., or alkoxy groups such as the methoxy, ethoxy, propoxy, or butoxy groups. It is especially preferable that these groups be in a position adjacent to the triazine nucleus, although this is not absolutely necessary. It is however, essential that the azo group not be in a position adjacent to the triazine nucleus, since in this position there is a blocking of the formation of the dyestuff. The position of the azo group in either the meta or para position depends on the method of synthesis. When the benzoguanamide is nitrated the nitro group will go into the meta position and this is where the resulting azo group will be attached. The para substituted compounds are formed by one of the alternative methods of synthesis, such as, starting from a 4,4'-dicarboxy azobenzene.

The following examples are illustrative of our invention but are not intended to limit it in any way. Additional modifications to those herein illustrated will be obvious to those skilled in the art. The parts in the examples are by weight unless otherwise specified.

EXAMPLE 1

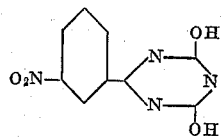

18.9 parts of benzoguanamide is dissolved in 100 parts by volume of 96% sulfuric acid at 15–20° C. Then over a period of 2.25 hours at 10–20° C., there is added 28 parts of mixed acid containing 27% HNO₃. The mass is warmed gradually to 35° C. and stirred at 35° C. until nitration is complete. The reaction mixture is then drowned in about 1200 parts of ice and water, stirred an hour, and until thoroughly mixed. The mixture is then filtered and the filter cake is washed with water and dried.

EXAMPLE 2

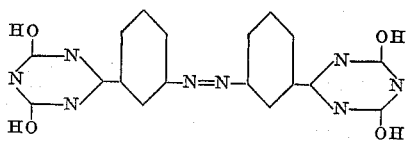

11.7 parts of the product of Example 1, is added to 250 parts by volume of a 10% sodium hydroxide solution at 30° C. The mixture is then heated to 60° C. and stirred until formation of the sodium salt of the gauanamide occurs. 60 parts by volume of 19 N sodium hydroxide is then added to the slurry. After 25 parts by volume of ethyl alcohol is added to it, the mass is heated to 80–85° C. There is then added in small amounts gradually 10 parts of zinc dust. The total volume of the reaction mixture is then increased to about 1200 parts by the addition of water. The mixture is heated to 100° C. and 9 parts of zinc dust is added gradually. The reaction product dissolves to give a colorless solution. This solution is clarified by the addition of 5 parts of diatomaceous silica and filtered hot. The filtrate is then aerated by bubbling air through at 50–70° C. for several hours. The 3,3'-bis-guanamido azobenzene product which precipitates is isolated by filtration and then stirred into a mixture of 50 parts by volume of 5 N hydrochloric acid and 150 parts of water. The product is filtered, washed acid-free with water and dried.

3,3'-bis-guanamido-4,4'-dichloroazobenzene is prepared by the procedure of Examples 1 and 2, starting with 22.4 parts of o-chlorobenzoguanamide.

EXAMPLE 3

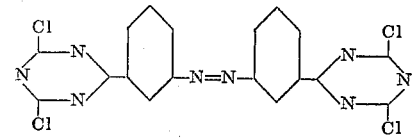

Taking care to avoid moisture, 8.1 parts of finely divided 3,3'-bis-guanamido azobenzene and 75 parts by volume of phosphorous oxychloride are stirred and heated to reflux. The mixture is refluxed until there is evidence of a decrease in hydrochloric acid evolution. The reaction mixture is then cooled to 20° C. when 0.5 part of triethylamine and 16.8 parts of phosphorous pentachloride are added. The mixture is heated at reflux for several hours after which 55 parts by volume of ortho-dichlorobenzene is added. The mixture is then heated at reflux until the reaction is complete. Excess phosphorous oxychloride is removed by distillation. The slurry of the desired product is cooled to 30° C. and the product is filtered, and washed with monochlorobenzene. The 3,3'-bis-dichlorotriazine azobenzene is then dried.

The corresponding 4,4'-dichloro-3,3'-bis-dichloro-s-triazine is prepared by the above procedure by starting with 9.5 parts of 4,4'-dichloro-3,3'-bis-guanamido azobenzene.

EXAMPLE 4

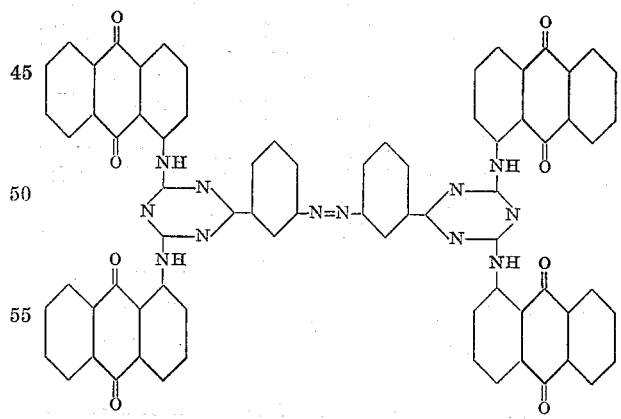

To 80 parts by volume of nitrobenzene are added 5.6 parts of the product of Example 3, and 8.9 parts of 1-aminoanthraquinone. The mass is gradually heated to 150° C. and held at 150–155° C. until the reaction is complete. The mixture is cooled to about 75° C., made alkaline with about 5 parts by volume of aqueous ammonium hydroxide and filtered at 50° C. The product is washed with nitrobenzene, and followed by alcohol, and dried.

When dyed by the vat dyeing procedure of Example 14 it gives a yellow shade on cotton of good fastness to light, washing and chlorine. When compared to the non-azo containing vat dye prepared from 1 mol of phenyldichlorotriazine and 2 mols of 1-aminoanthraquinone dyed by the same procedure, it is found to be a redder yellow or more bathochromic shade of yellow.

EXAMPLE 5

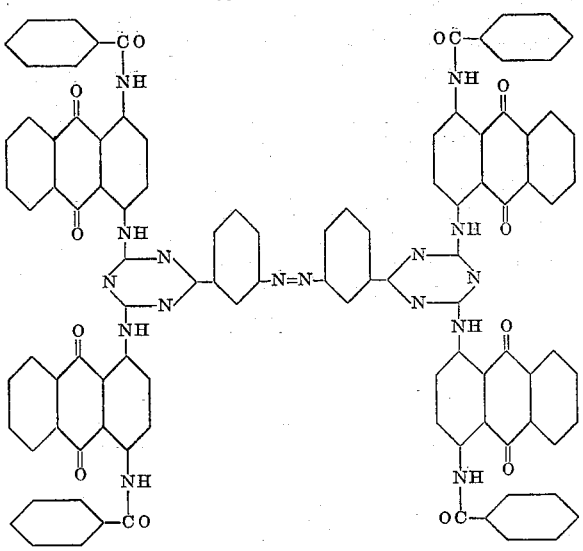

To 60 parts by volume of nitrobenzene are added 2 parts of the product of Example 3, and 5.5 parts of 1-amino-4-benzamidoanthraquinone. The mass is stirred at 135–140° C. for a short time and then at 150–155° C. until the condensation is complete. After the mixture has cooled to 50° C., the desired product is isolated by filtration, washed with nitrobenzene and with alcohol and then dried at 75° C.

When dyed by the procedure of Example 14, it dyes cotton a red shade from a dark red vat.

EXAMPLE 6

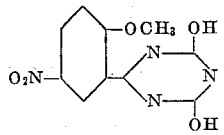

To 120 parts by volume of 96–97% sulfuric acid at about 20° C. is added 22 parts of o-methoxybenzoguanamide. When completely dissolved, the solution is cooled to 10° C. There is then added gradually at 10–15° C., 23.5 parts of mixed acid containing 27% HNO₃. The nitration mixture is then stirred while gradually warming to 20° C. It is then drowned in 1500 parts of water and the product is isolated by filtration and washed acid-free with water.

EXAMPLE 7

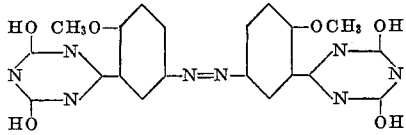

26.4 parts of 5-nitro-2-methoxybenzoguanamide prepared in Example 6, is dissolved in a solution of 20 parts of potassium hydroxide in 400 parts of water. To this solution is added 60 parts of sodium hydroxide in 50 parts of water. The resultant slurry is heated to 80° C. and 20 parts of dextrose is added at 85° C. The mass is stirred for a period at 90–95° C. after which 10 parts more of dextrose is added. Stirring is continued at 90–95° C. until the reduction is complete. After cooling to room temperature, the mixture is acidified with 145 parts by volume of concentrated hydrochloric acid, adding ice to keep the temperature below 60° C. The product is isolated by filtration, washed acid-free with water and dried.

The analogous 4,4′-diethoxy or 4,4′-dibutoxyazobenzene-3,3′-bis-guanamide is prepared by the procedures of Examples 6 and 7 with 23.3 parts of o-ethoxybenzoguanamide or 26.1 parts of o-butoxybenzoguanamide, respectively.

EXAMPLE 8

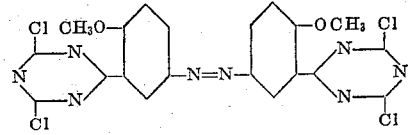

A mixture consisting of 18.5 parts of the product of Example 7, 34 parts of phosphorous pentachloride and 50 parts by volume of phosphorous oxychloride is heated and stirred to reflux and held at this point until replacement of all hydroxy groups by chlorine is complete. The reaction mass is then drowned in a mixture of water and ice of about 800 parts by volume. The temperature of the drowned mixture is adjusted to below 20° C. with ice and the slurry is stirred for a short period. The product is then isolated by filtration, washed acid-free with water, and dried.

EXAMPLE 9

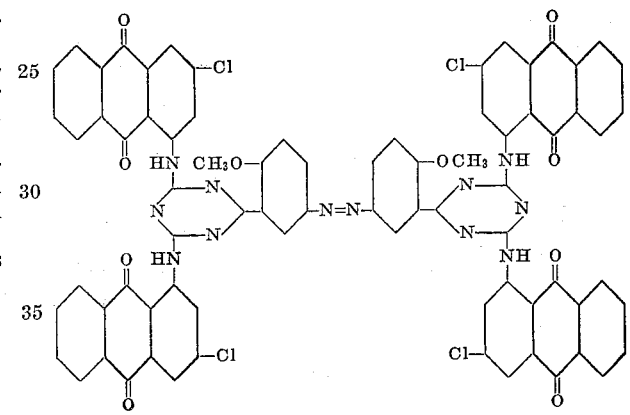

3.4 parts of the product of Example 8 is boiled with 100 parts by volume of o-dichlorobenzene and clarified by filtration. To this filtrate is added 6.4 parts of 1-amino-3-chloroanthraquinone. The mixture is stirred at 130–140° C. until condensation is complete. It is then cooled to about 75° C., filtered and the vat dye is washed with o-dichlorobenzene and alcohol and dried.

When dyed by the vat dyeing procedure of Example 14, a yellow having good build-up properties on cotton is obtained.

EXAMPLE 10

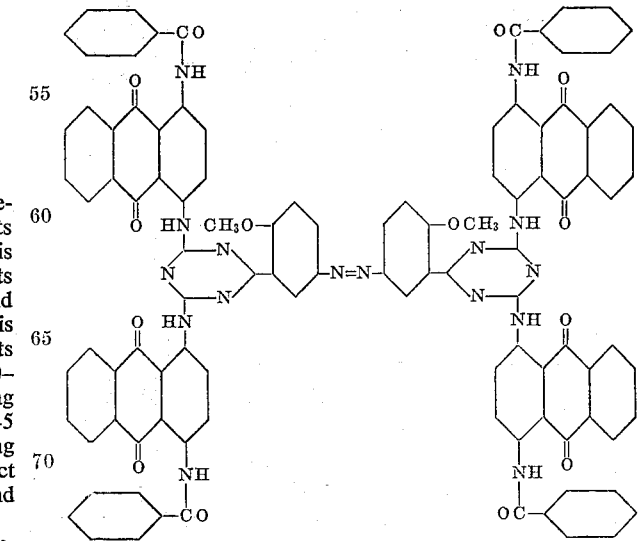

To 150 parts by volume of nitrobenzene are added 3.3 parts of the product of Example 6, and 8.2 parts of 1-amino-4-benzamidoanthraquinone. The mass is stirred and heated gradually to 150° C. and held at this temperature until the condensation is complete. It is then cooled to 50° C. and filtered. The desired product is washed with nitrobenzene at 70°–80° C. until the filtrate is nearly colorless and then washed with alcohol to remove the nitrobenzene. The product is then dried.

When dyed on cotton using the vat dyeing procedure of Example 14, a red shade is obtained.

EXAMPLE 11

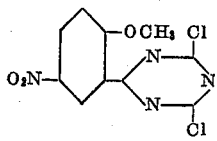

Taking care to avoid moisture, one half of 26.4 parts of 5-nitro-2-methoxybenzoguanamide (of Example 6) is mixed with 41.5 parts of phosphorous pentachloride and 75 parts by volume of phosphorous oxychloride. The mass is stirred and heated at reflux until all of the guanamide is dissolved. The second half of the nitromethoxybenzoguanamide is then added and the refluxing continued until complete solution is obtained. The mixture is then heated further while distilling off about 25 parts by volume of phosphorous oxychloride. The reaction mixture is allowed to cool and is drowned in a mixture of ice and water (about 800 parts in all) keeping the temperature under 20° C. After stirring to effect complete mixture, the desired product is filtered and washed acid-free with ice water and dried.

EXAMPLE 12

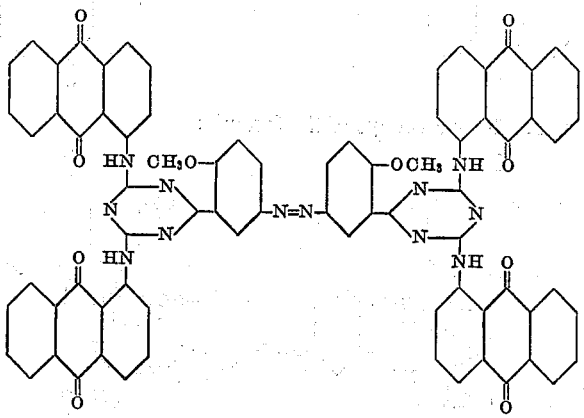

A mixture of 6.0 parts of the product of Example 11, 8.9 parts of 1-aminoanthraquinone and 100 parts by volume of ortho-dichlorobenzene is heated with stirring to 130° C. To the slurry is added 55 parts by volume more of ortho-dichlorobenzene and the mixture stirred at 130° C. until condensation is complete. The mixture is cooled to 50° C. and filtered. The product is washed with ortho-dichlorobenzene and finally with alcohol.

The wet cake obtained above is added to 280 parts by volume of water and 60 parts of sodium hydroxide is added. To the mixture, at 50° C., is added 20 parts of dextrose and the mixture stirred at 80° C. until reduction is complete. The product is isolated by drowning the reaction mixture in 800 parts of water and filtering at about 40° C. after stirring. The product is washed free from alkali and dried.

When dyed using the procedure of Example 14, it gives a much redder yellow shade on cotton than the analogous o - methoxyphenyl - 4,6 - dianthraquinonylamino - s - triazine and shows superior rate of build-up.

EXAMPLE 13

The vat dye of Example 9 may also be made by a different procedure. The product of Example 11 is condensed with 1-amino-3-chloroanthraquinone and 6.5 parts of this product is mixed with 100 parts by volume of 5 N sodium hydroxide solution and heated to 50° C. Gradually at 60–70° C., 10 parts of dextrose is added. The mixture is heated to 80° C., and stirred until condensation is complete. It is then drowned in about 500 parts of water. To this diluted mixture is added 100 parts by volume of 3% hydrogen peroxide solution and the mixture stirred at 80° C. for about an hour. The product is isolated by filtration, washed alkali free with water and dried.

When dyed by the procedure of Example 14, a yellow shade is obtained on cotton which is a redder shade than that obtained with the half molecule not containing an azo group.

EXAMPLE 14

0.2 part of dyestuff is pasted with 2 parts by volume of sulfonated castor oil and the paste is slurried in a mixture of 200 parts of water, and 5 parts by volume of 30° Bé. sodium hydroxide. The mixture is heated to 140° F. and 1.5 parts of sodium hydrosulfite is added. The vat solution is held at 140° F. until reduction is complete, after which warm water is added to make the volume to 400 parts by volume. A cotton skein weighing 20 parts is added and the mixture is agitated at 140° F.; 12 parts of sodium chloride is added and the dyeing operation is continued until the dyeing is complete. The skein is removed from the bath, rung out and rinsed in warm water, it is then agitated for a short time in an aqueous solution of sodium bicarbonate and sodium perborate to oxidize the leuco. The dyed skein is then rinsed thoroughly and soaped at the boil followed by a new rinse and drying.

The following dyeing shades are obtained using the dyestuffs of the indicated examples:

Example 4 _____ Yellow
Example 5 _____ Red
Example 9 _____ Yellow
Example 10 _____ Red

EXAMPLE 15

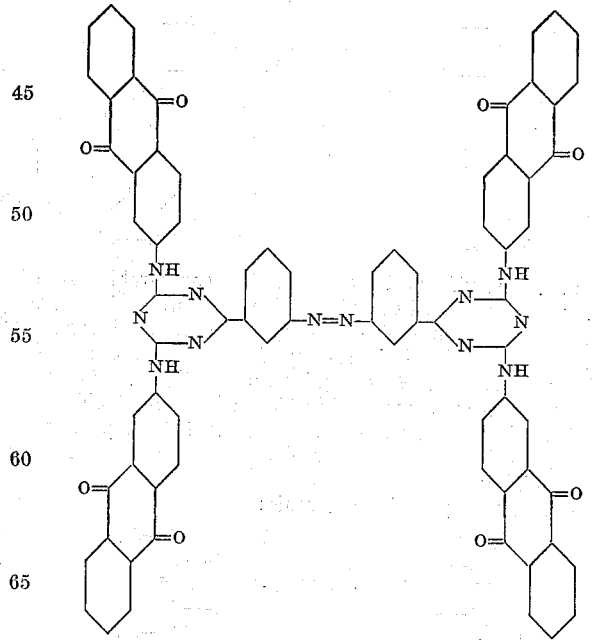

The procedure of Example 4 is followed, using 2-aminoanthraquinone in place of 1-aminoanthraquinone. The product is a yellow solid dyeing cloth a lighter shade of yellow than the product of Example 4.

Similar products are obtained, if equivalent amounts of 2-amino-3-bromoanthraquinone, 2-amino-3-chloroanthraquinone, or 2-amino-3-methylsulfonyl-anthraquinone are used in place of 2-aminoanthraquinone.

EXAMPLE 16

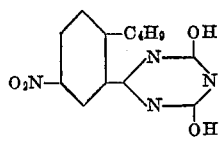

The procedure of Example 6 is followed using o-butylbenzoguanamide (preparable from o-butylbenzoylchloride and dicyandiamide) in place of the o-methoxybenzoguanamide. The product is used in the procedure of Examples 7, 8, and 9 to produce the dye of the structure

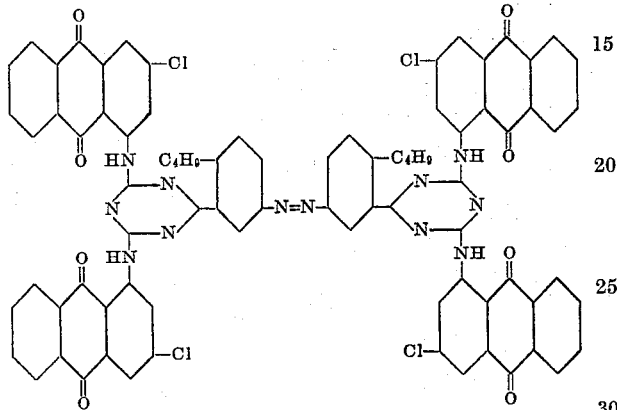

Similarly, from o-toluyl chloride, o-toluyl guanamide is prepared and, by the procedures of Examples 6, 7, 8, and 9, is converted to the analogous dyestuff.

EXAMPLE 17

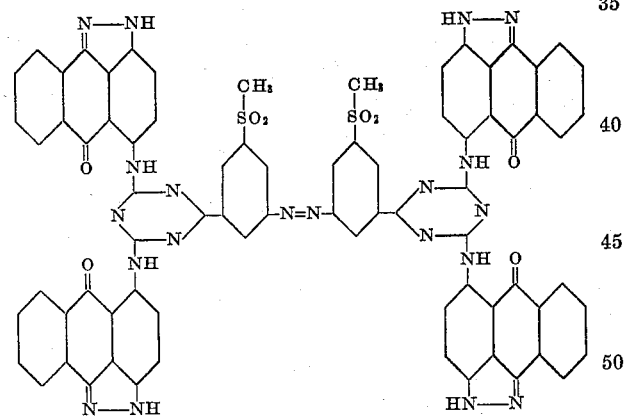

m-Methylsulfonyl benzoguanamide (preparable from m-methyl sulfonyl benzoyl chloride) is converted by the method of Example 6 to a nitro methylsulfonyl benzoguanamide, which is in turn used in the procedures of Examples 7, 8, and 9 (an equivalent quantity of 4-aminopyrazolanthrone being used in place of 1-amino-3-chloroanthraquinone in the procedure of Example 9) to produce the dyestuff of the above formula.

We claim:

1. Azo vat dyes of the formula:

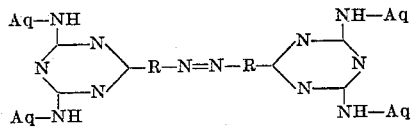

wherein Aq is an anthraquinonyl radical, R is a member of the group consisting of phenylene and the chlorine, bromine, lower alkyl, and lower alkoxy substituted derivatives thereof, in which the azo group is attached in a position other than ortho to the triazinyl group.

2. The dyes of claim 1 in which Aq is an alpha-anthraquinonyl radical.

3. The azo vat dye of the formula:

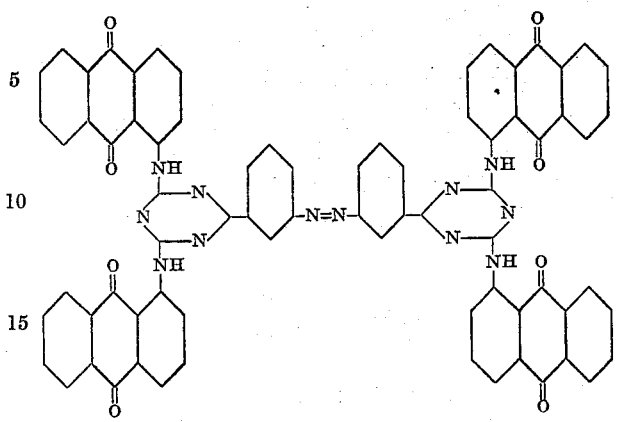

4. The azo vat dye of the formula:

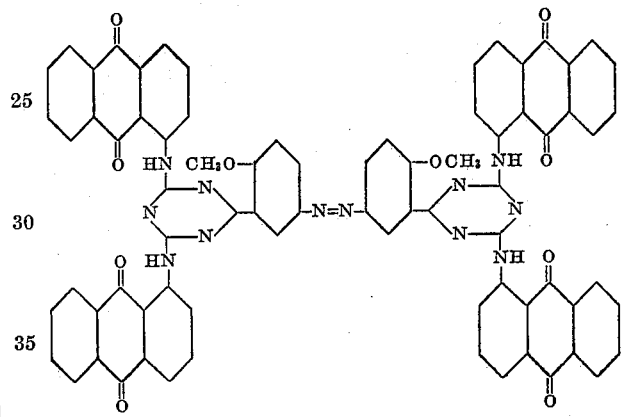

5. The azo vat dye of the formula:

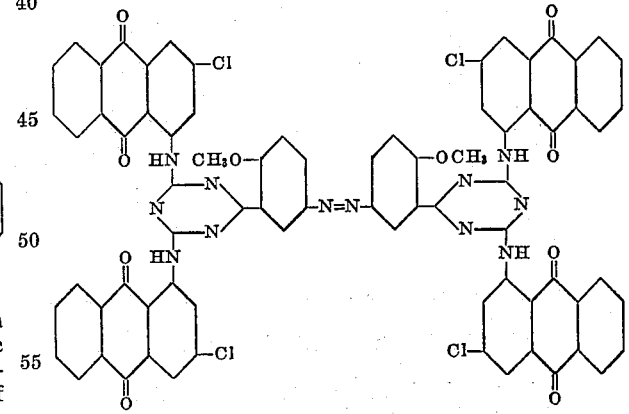

6. Azo compounds of the formula:

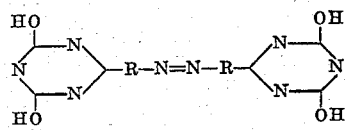

wherein R is a member of the group consisting of phenylene and the chlorine, bromine, lower alkyl, and lower alkoxy substituted derivatives thereof, in which the azo group is not adjacent to the triazinyl group.

7. The azo compound of the formula:

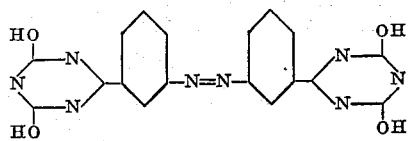

8. The azo compound of the formula:
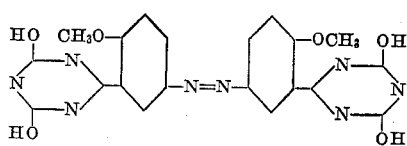
9. Azo compounds of the formula:
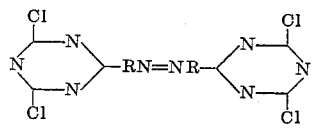
in which R is a member of the group consisting of phenylene and the chlorine, bromine, lower alkyl, and lower alkoxy substituted derivatives thereof, in which the azo group is not adjacent to the triazinyl group.
10. The azo compound of the formula:
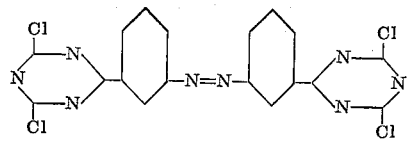
11. The azo compound of the formula:
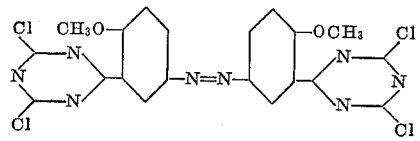
No references cited.